May 21, 1929.  M. J. McANENY  1,713,849
AIR PRESSURE CONTROLLING MEANS
Filed April 18, 1927
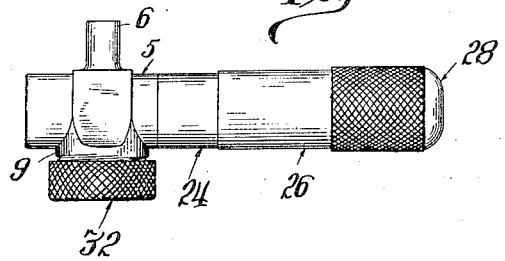
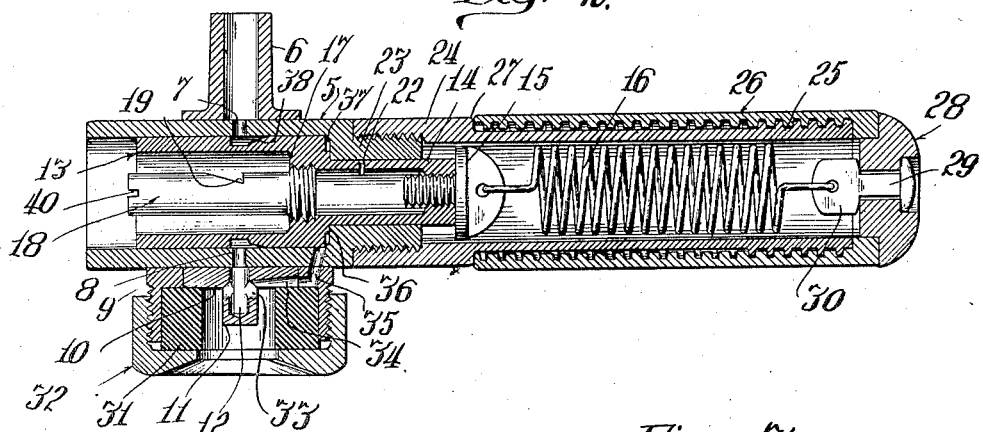
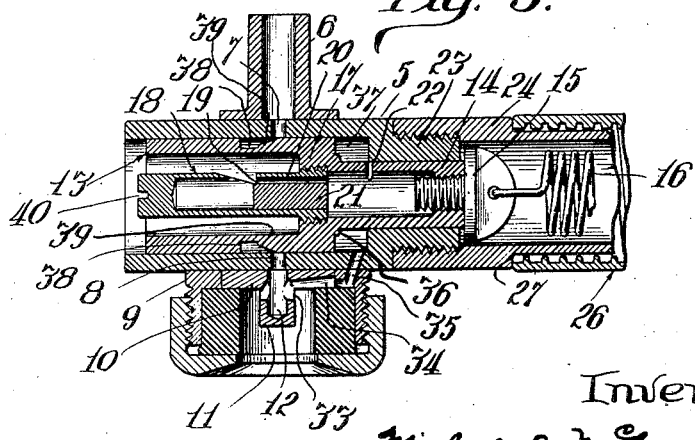
Witnesses
Milton Lenoir
Elmer L. Quickel.
Inventor
Michael J. McAneny
By George Heidman
Attorney Patented May 21, 1929.

1,713,849

UNITED STATES PATENT OFFICE.

MICHAEL J. McANENY, OF DENVER, COLORADO, ASSIGNOR TO JAMES L. GOREE, OF DENVER, COLORADO.

AIR-PRESSURE-CONTROLLING MEANS.

Application filed April 18, 1927. Serial No. 184,458.

My invention relates to means intended more particularly in connection with the inflation of pneumatic tires, namely means for regulating or controlling the quantity of air introduced into a pneumatic tire in keeping with the preselected pressure contemplated and whereby the user will be informed when said pressure has been obtained.

The invention has for its object a construction whereby the introduction of air into a pneumatic tire from a source of air supply will be automatically controlled in keeping with the speed at which such air is introduced and escape of the air supply during use prevented.

The invention also contemplates a construction which will not shut off the air supply until the preselected air pressure has been attained, namely the predetermined pressure for which the device has been adjusted.

The objects and advantages of the invention will be readily apparent from the detailed description of the drawing, wherein—

Figure 1 is a side elevation of my improved means.

Figure 2 is an enlarged longitudinal sectional view with the device in normal condition.

Figure 3 is an enlarged longitudinal sectional view of the valve end of the device, showing the same in alarm sounding condition.

The specific embodiment of the invention as disclosed in the drawing comprises a casing 5 having an inlet nipple 6, the duct whereof communicates with a port 7 in the casing 5; the opposite side of the casing being provided with a port 8 communicating with an outlet nozzle 9. The nozzle 9 is shown internally provided with a disc 10 which is provided with a tire-valve controlling stud 11; the disc 10 and its stud 11 having a counterbore 12 terminating short of the outer end of the stud portion 11, while the inner end of the counterbore registers with the port 8 in the casing 5.

The interior of the casing 5 is preferably cylindrical to receive the piston valve 13 of predetermined length relative to the main interior portion of the casing 5. The inner end of the piston valve 13 is shown provided with an end wall having an elongated hollow stem 14, the end whereof has a tapped opening to receive the threaded shank of the spring connector member 15 to which one end of a contractible spring 16 is connected. The piston valve 13, adjacent the hollow stem portion 14, is provided with a diaphragm or end wall 17 having an opening therethrough communicating with the passage in the hollow stem 14. The opening in the diaphragm or end wall 17 is threaded to receive the inner threaded end of an alarm sounding element or whistle 18. The element, at its outer end, is hollow and provided with an opening 19 in the side wall thereof which communicates with a duct 20 extending longitudinally through the inner solid end 21 of the alarm sounding element 18; the duct 20 therefore communicating with the chamber within the hollow tubular extension 14 of the piston valve. The piston valve extension 14, at a predetermined point in its side, is provided with a small port 22 which normally is closed by the reduced elongated end 23 of the valve casing 5, because the extension 14 of the valve is in snug sliding relation with the reduced end 23 of the casing, as shown in Figure 2.

The reduced end 23 of the casing 5 is externally threaded to receive the internally threaded end, preferably tubular, of a shell 24; the latter in turn at its outer end being threaded at 25 to receive the internally threaded sleeve member 26. The sleeve member 26 is shown threaded internally throughout its length, except for the immediate outer inwardly flanged end. The shell 24, adjacent the casing end, is preferably shouldered or enlarged as at 27 to form an abutment for the sleeve member 26 when the latter has been screwed lengthwise of the shell to the maximum extent, as shown in Figure 2, at which time the device will have been set for the smallest amount or minimum degree of pressure.

The outer end of the sleeve 26 is shown provided with a cap member 28 through which a pin 29 extends; the pin being shown provided at each end with a head to prevent its removal while at the same time permitting free rotation of the pin in the cap member 28 during screwing rotation of the sleeve 26 and the resultant rotation of the cap 28. The inner head 30 of the pin 29 is shown apertured to receive the end of the contracting spring 16.

The nozzle 9 is counterbored to preferably receive the resilient washer or gasket 31 which overlaps the disc member 10; the gasket in turn being held in the nozzle by means of the cap member 32 which screws onto the nozzle and is provided with a central opening therethrough to fit over and receive the end of the casing of a tire valve. The inner diameter of the gasket 31 is such as to permit the tire valve casing to fit therein, allow the stud 11 to engage the pin of the tire-valve and force said valve off its seat and allow air to pass thereabout and into the tire when the device is applied to the valve casing.

The stud 11 is provided in its side with a transverse port 33 communicating with the counterbore 12; and this port 33 also communicates with a radial duct or groove 34 formed in the disc 10, extending toward the perimeter thereof where the duct 34 communicates with a port 35 formed through the wall of the nozzle 9 and the casing 5. The port 35 communicates with the chamber in the casing 5 rearward of the piston valve 13, namely forward of and adjacent to the reduced end of the casing 5; the port 35 being practically closed by the piston-valve while the latter is in normal position.

The shell 24 is preferably provided with suitable graduations or indicating marks (not shown); the graduations being suitably spaced in a direction lengthwise of the shell 24 to indicate different degrees of pressure, as for example from 10 to 60 or more pounds, with said graduations increasing in value from the casing end of the shell toward the outer end thereof. That is to say, when the sleeve 26 is screwed so as to move toward the right in Figure 2, the device will be set for a greater pressure than when the sleeve is in the position shown in Figure 2, because such screwing of the sleeve 26 distends spring 16 and places the piston valve 13 under greater tension. The piston valve 13, adjacent to the tubular extension 14 thereof, is shown provided with a small shoulder 36 adapted to abut against the inner reduced end of the casing 5 and thus provide the small space or chamber 37 at the inner end of the main portion of the piston valve 13 when the latter is in the normal open position shown in Figure 2.

The main body of the piston valve 13 at a predetermined point is provided with a circumferential groove or port 38 which normally registers with ports 7 and 8 in the casing. This port 38 decreases in depth, and therefore in capacity, toward the inner end of the piston valve as shown at 39; this being accomplished by beveling or tapering one side of the groove 38 in the specific exemplification of the invention.

The alarm sounding element or whistle 18 is of smaller external diameter than the inner diameter of the outer end of piston valve 13 in order to provide passage thereabout for the air which passes through the alarm sounding element when the latter comes into play; and the outer end of the alarm sounding element 18 is preferably provided with a tool receiving slot 40 to enable said element to be readily screwed into the piston valve during assembly.

In operation, the user regulates the device to the degree of air pressure intended in the tire by screwing sleeve 26 lengthwise of the shell 24 until the inner end of the sleeve registers with the graduation which designates the required pressure intended in the tire to be inflated. The spring 16 is of such length that it normally holds the piston valve 13 inwardly with its shoulder 36 abutting against the reduced inner end of the shell 5, at which time the port 7 at the nipple 6 and the port 8 at the nozzle side will be in register with the main or deep portion of the circumferential groove or port 38 in the piston valve 13.

It is evident that when sleeve 26 is screwed outwardly lengthwise of shell 24, spring 16 is thereby distended and the piston valve placed under greater tension, thus requiring a predetermined degree of air pressure from the tire filling side of the device to move the piston valve against the action of the spring. The nipple 6 is then attached to the tube or hose leading from the air supply and nozzle 9 is placed over the tire valve casing thereby causing the stud 11 to depress the tire valve off its seat; the gasket 31 forming air tight relation with the sides of the valve casing. The air from the air supply will pass through port 7 around the circumferential groove or port 38, out through port 8 into counterbore 12 of stud 11 and out through the side ports 33 in the stud and thence into the tire valve. As the incoming air is under considerable pressure, it will be discharged through the side ports 33 faster than it can flow into the tire valve and as a result a certain amount of the air will pass through ports 34 and 35 and seep between the casing and the piston-valve and result in building up pressure in the chamber 37 rearward of the main portion of the piston valve 13. The building up of this pressure will induce slight outward movement of the piston valve, namely to the left in Figures 2 and 3, thereby bringing the tapered or reduced portion 39 of the circumferential port into alignment with the incoming port 7 and as a result decreasing the inflow to a degree substantially equal to the receiving capacity of the tire valve, without, however, completely shutting off inflow but allowing continued inflation of the tire to the extent desired. As the pressure on the tire side of the device reaches the selected or predetermined pressure for which the device has been regulated, the pressure in chamber 37 rearward of the piston valve will likewise have increased and built up to a degree sufficient to overcome the tension of spring 16. The built up pressure in chamber 37 will cause the piston valve to move outwardly, namely to the left in Figure 2, positioning the small port 22 in the stem 14 of the piston valve where it is in communication with the chamber 37, as shown in Figure 3. This allows the air in chamber 37 to pass through port 22 into the hollow stem 14 of the piston valve and thence flow through the duct 20 in the element or whistle 18 and cause an alarm to be sounded, thereby notifying the user that the desired pressure in the tire has been obtained. As soon as this has been accomplished, the operator shuts off the air supply and removes the nozzle from the tire valve, allowing the latter to close.

The structure disclosed is believed to be the simplest embodiment of the invention which has been described in terms employed merely as terms of description and not as terms of limitation as structural modifications may be made without, however, departing from the spirit of my invention.

What I claim is:

1. An air pressure controlling means comprising a casing having an inlet nipple on one side, an outlet nozzle on the opposite side, said casing being reduced at one end to provide a valve-seat, a shell secured to said reduced end, a sleeve threaded on said shell, a piston valve in said casing, provided at one end with an extension disposed through the reduced end of the casing and having an air duct opening through the side of said extension, a contracting spring arranged in said shell with one end secured to said piston extension while the other end has operative connection with said sleeve, the piston-valve being provided with a circumferential groove normally adapted to register with said inlet nipple and said outlet nozzle, said groove decreasing in depth toward the spring attached end, the wall of the casing having an air duct leading from the outlet nozzle to the casing interior adjacent to the valve-seat in the casing, and an alarm sounding element mounted in said piston valve with one end communicating with the air duct in said piston-valve extension.

2. An air pressure controlling means comprising a casing provided with inlet and outlet ducts in opposite sides, a piston-valve slidable in said casing and having a circumferential air duct of diminishing capacity toward one end of the piston-valve, said piston having a reduced tubular extension at one end provided with a vent-port in its side normally closed by the casing wall, a duct intermediate of the outlet duct in the casing and a point rearward of the main body of the piston-valve, a hollow extension at one end of said casing, an adjustable sleeve on said extension, and a contracting spring within said hollow extension with one end secured to the piston valve while the other end is operatively connected with said sleeve.

3. An air pressure controlling means comprising a casing provided with an inlet nipple and an outlet nozzle, said casing having a reduced end, an air passage intermediate of the outlet nozzle and the reduced end of the casing, a hollow piston valve slidable in the casing and provided with a circumferential groove normally in register with the inlet nipple and the outlet nozzle, said piston-valve normally covering said air passage, the piston valve at its inner end having a hollow extension slidable in the reduced end of the casing and provided with a vent port communicating with the interior of the piston valve and normally closed by the reduced end of the casing, the relation between the circumferential groove and said vent port being such that the former is practically closed when the latter is open, a hollow extension at one end of the casing, a regulable sleeve on said extension, and a contractible spring within said extension with one end secured to the hollow extension of the piston-valve and the other end secured to said sleeve.

4. An air pressure controlling means comprising a casing having an inlet nipple and an outlet nozzle, one end of the casing terminating in a reduced hollow extension, an air passage intermediate of the outlet nozzle and the reduced end of the casing, a hollow piston-valve movable in said casing and provided with a circumferential air passage normally in register with the inlet nipple and the outlet nozzle, said passage diminishing toward the rear end of the piston-valve, said piston-valve normally covering said air passage, the piston-valve at one end being provided with a hollow stem slidable in the reduced extension of said casing, said piston-valve stem having a vent port normally covered by the casing extension, the relation between the circumferential air passage in the piston-valve and said vent port being such that the diminished end of said circumferential air passage is practically out of register with the inlet nipple and outlet nozzle when said vent port reaches uncovered position and communicates with the chamber in the casing rearward of the main body of the piston-valve, a whistle member located within the piston-valve with its air-duct communicating with the hollow stem of the piston-valve forward of said vent port, a shell secured to the extension of said casing and externally threaded at its outer end, an internally threaded sleeve on said shell, and a contractible spring within said shell having one end operatively connected to the stem of the piston-valve while the other end is operatively connected with the outer end of said sleeve.

5. An air pressure controlling means comprising a casing having an inlet nipple on one side, an outlet nozzle on the opposite side, said casing having a reduced hollow end, an elongated shell secured on said reduced end, a sleeve lengthwise adjustable on said shell, a hollow piston-valve in said casing provided with a reduced tubular end extending through said hollow end of the casing, said tubular valve end being provided with an air port in its side leading to the interior thereof and normally covered by the reduced end of the casing, a contractible spring located in said shell, means for connecting one end of said spring to the tubular extension of the piston-valve, said piston-valve being provided with a circumferential air passage normally registering with the inlet nipple and the outlet nozzle and diminishing in capacity toward the inner end of the piston-valve, means whereby the opposite end of the spring is pivotally connected to the outer end of said sleeve, and a tubular whistle member located within the piston-valve in communication with the interior of the tubular end thereof.

6. An air pressure controlling means comprising a casing having a reduced hollow extension, an inlet nipple and a discharge nozzle disposed outwardly from the sides of the casing and communicating therewith, a hollow elongated piston-valve slidable in the casing and normally seating adjacent to the reduced end of the casing, said piston-valve being provided with a circumferential air passage normally registering with the openings in the nipple and in the nozzle, the capacity of said circumferential air passage gradually diminishing toward the rear end of the piston-valve, an air passage leading from the nozzle into the casing adjacent to the reduced extension thereof and normally closed by said piston-valve, said piston-valve having a hollow stem at one end slidable in the reduced extension of the casing, said piston-valve stem having a vent port communicating with the interior of the stem and normally closed by the casing extension, the relation between the circumferential air passage of the piston-valve and said vent port being such that the former is substantially out of register with the openings in the nipple and in the nozzle when said vent port is being uncovered by the casing extension, a tubular whistle member located within the piston-valve with its inner end secured in the stem of said piston-valve, said whistle member having an air port lengthwise thereof communicating with the interior of the piston-valve stem forward of said vent port, means whereby the piston-valve is held under pressure, and regulable means whereby the pressure of said last mentioned means may be controlled.

7. An air pressure controlling means comprising a casing having a reduced end extension and provided with an inlet nipple and a discharge nozzle at opposite sides, an air passage between said nozzle and the casing interior adjacent to the reduced end thereof, a hollow piston-valve slidable in the casing and provided with a tubular stem slidable in the reduced end extension of the casing, said piston-valve being provided with a circumferential air passage normally communicating with the inlet nipple and the outlet nozzle, said air passage diminishing in capacity toward the inner end of the piston-valve, the stem of the piston-valve being provided with a vent port leading to the interior thereof and normally covered by the casing reduced extension, means whereby the inner end of the piston-valve is normally held in slight spaced relation with the reduced end wall of the casing, a tubular whistle member having a longitudinal air port opening at the inner end thereof in communication with the interior of the stem of the piston-valve, a shell secured on the end extension of the casing, an internally threaded sleeve adjustable on said shell to move lengthwise thereof, a contractible spring located in said shell, one end of said spring being secured to the stem of the piston-valve, and means whereby the other end of said spring has swiveled connection with the outer end of said sleeve.

8. An air pressure controlling means comprising a casing having an inlet port and an outlet port, the casing being provided with a reduced tubular portion, a hollow piston valve in said casing provided at one end with a hollow stem slidable in said reduced tubular portion of the casing, said piston valve being provided with a circumferential air passage adapted to simultaneously register with the inlet port and outlet port of the casing, a vent port in the hollow stem of the piston valve for establishing communication between the casing interior rearward of the piston valve and the interior of the piston valve when the latter has moved forward a predetermined extent, means for yieldingly holding said piston valve in normal position, and regulable means mounted on said casing whereby the holding pressure of said last mentioned means may be regulated.

9. An air pressure controlling means comprising a casing provided with a reduced tubular portion at one end of the casing chamber, said casing having an inlet port and an outlet port at opposite sides, a hollow piston valve in said casing provided with a hollow stem movable in said casing reduced portion, said hollow stem at a predetermined point being provided with a vent port leading to the stem interior, a circumferential air passage in the piston valve adapted to simultaneously register with the inlet port and the outlet port of the casing when said piston valve is adjacent to the reduced portion of the casing, an air port intermediate of the outlet port of the casing and the casing interior and closed by said piston valve when the latter is in normal position, a regulable member at one end of the casing, and a contractible spring intermediate of said member and said piston valve for yieldingly holding the latter in normal position.

MICHAEL J. McANENY.